United States Patent [19]

Willard

[11] Patent Number: 4,769,253

[45] Date of Patent: * Sep. 6, 1988

[54] METHOD FOR PREPARING EXTRUDED FRIED SNACK PRODUCTS

[76] Inventor: Miles J. Willard, 229 N. Lloyd Cir., Idaho Falls, Id. 83402

[*] Notice: The portion of the term of this patent subsequent to Nov. 18, 2003 has been disclaimed.

[21] Appl. No.: 921,869

[22] Filed: Oct. 22, 1986

Related U.S. Application Data

[63] Continuation-in-part of Ser. No. 820,831, Jan. 20, 1986, Pat. No. 4,623,548, which is a continuation of Ser. No. 732,909, May 9, 1985, abandoned, which is a continuation of Ser. No. 614,381, May 24, 1984, abandoned, which is a continuation of Ser. No. 384,985, Jun. 4, 1982, abandoned.

[51] Int. Cl.⁴ ............................................. A21D 10/00
[52] U.S. Cl. .................................... 426/559; 426/440; 426/808
[58] Field of Search ............... 426/549, 559, 560, 622, 426/625, 653, 661, 440, 446, 450, 496, 808, 506, 509

[56] References Cited

U.S. PATENT DOCUMENTS

| | | | |
|---|---|---|---|
| 2,919,986 | 1/1960 | Johnson | 426/559 |
| 2,954,296 | 9/1960 | Clausi et al. | 426/559 |
| 3,246,990 | 4/1966 | Thompson et al. | 426/559 X |
| 3,447,931 | 6/1969 | Benson et al. | 426/559 |
| 3,462,276 | 8/1969 | Benson | 426/440 X |
| 3,499,766 | 3/1970 | Vollink et al. | 426/559 |
| 3,600,193 | 8/1971 | Glabe et al. | 426/808 X |
| 3,703,378 | 11/1972 | Bretch | 426/559 X |
| 3,922,370 | 11/1975 | Prakash | 426/440 X |
| 3,968,265 | 7/1976 | Shatila et al. | 426/808 X |
| 3,997,684 | 12/1976 | Willard | 426/559 X |

*Primary Examiner*—Arthur L. Corbin
*Attorney, Agent, or Firm*—Hopkins, French, Crockett, Springer & Hoopes

[57] ABSTRACT

An expanded fried cereal-based snack product is prepared from a dough consisting essentially of (1) a low water-absorbing component (LOWAC) comprising one or more raw or partially gelatinized cereal flours comprising about 15% to about 80%, by weight, of the total dry solids; (2) a high water-absorbing component (HIWAC) comprising one or more pregelatinized cereal starches or flours comprising from about 3% to about 40%, by weight, of the total dry solids; and (3) a starch component comprising one or more ungelatinized starches comprising from about 10% to about 45%, by weight, of the total dry solids. The dry solids are mixed with water to form a dough having a moisture content from about 40% to about 50%, by weight of the dough, and a dough piece is then extruded from the dough and fried in hot cooking oil to form a fried snack that expands about 1.2 to about 3.0 times during frying, producing a snack of uniform expansion and low fat content.

12 Claims, No Drawings

METHOD FOR PREPARING EXTRUDED FRIED SNACK PRODUCTS

CROSS-REFERENCE TO RELATED APPLICATIONS

This is a continuation of application Ser. No. 820,831 filed Jan. 20, 1986, now U.S. Pat. No. 4,623,548, which is a continuation of Ser. No., 732,909 filed May 9, 1985, now abandoned, which is a continuation of Ser. No. 614,381 filed May 24, 1984, now abandoned, which is a continuation of Ser. No. 384,985 filed June 4, 1982, now abandoned.

BACKGROUND OF THE INVENTION

1. Field of the Invention

This invention relates to a process for making fried snack products from mixtures of precooked and raw flours made from cereal grains such as corn, wheat, oats, rye, barley, rice, and the like. One practice of the invention is particularly suitable for making extruded snack products from dry milled corn flours.

2. Description of the Prior Art

Traditional fried corn snacks are made from whole kernel corn principally by two methods. Kernels of corn are steeped in a hot lime solution to soften the outer hull and partially gelatinize the starch in the endosperm. The treated grains are washed to remove the softened hull and ground to form a plastic dough containing about 50% moisture, known as masa. In one method, thin pieces of masa dough are formed be extrusion and fall directly into hot cooking oil in a deep fat fryer, as described in U.S. Pat. Nos. 2,002,053 to Doolin; 3,083,103 to Anderson et al; and 3,278,311 to Brown et al. As a result of the high initial moisture content of the dough pieces, the fat content of the fried product is undesirably high, often above 35% to 40%. The fried products also are hard and brittle.

In another method, a similar freshly-ground masa is sheeted between rollers, cut into pieces, and baked to reduce the moisture content from about 35% to as low as about 20% before frying, as described in U.S. Pat. Nos. 2,905,559 to Anderson et al and 3,690,895 to Amadon et al. The dough should have a moisture content of about 50% for effective sheeting, but frying a sheeted corn-based dough with 50% moisture typically causes undesirable puffing of the fried product. As a result of the reduced moisture content of the baked dough pieces, the fat content of the fried product is about 20% to 25%. However, the fried pieces tend to have an uneven expansion, with large blistered areas and a hard, chewy texture. The same uneven structure also is found in the extruded masa-based snacks described above.

It appears that areas of non-uniform structure in the fried masa-based snacks may be caused by non-uniform composition of the masa dough, namely, areas of undercooked corn particles, resulting in non-expanded sections of the fried snack.

All such conventional corn snacks have the characteristic flavor of lime-soaked corn as a result of residual lime and the by-products from its reaction with corn constituents.

Dried masa flour is also available for the manufacture of corn snacks and other Mexican food specialties, such as tortillas and taco shells. In typical processes for making such dried masa flour, described in U.S. Pat. Nos. 4,344,366 to Garza; 2,704,257 to Diez De Sollano et al; and 3,369,908 to Gonzales et al, the lime-treated corn is ground and dehydrated to a stable form. The dried masa flour can be later rehydrated with water to form a dough for extrusion or sheeting.

Partially cooked, dry-milled whole corn flours are also made from whole corn kernels, as in the methods described in U.S. Pat. Nos. 3,404,986 to Wimmer et al and 4,089,259 to Stickle et al. The corn in these methods is gelatinized without lime treatment, i.e., without removing the outer hull. These whole corn flours can be mixed with water to form a dough for making a fried snack. However, the fried snacks made from these whole corn flours are hard and brittle and retain too much fat, probably because of the low water absorption of the flours. The same is true for other cereal gains, which otherwise have potential for use as novel, nutritious, economical fried snack products. Such cereal grains include precooked wheat, known as bulgur, steam-rolled grains, such as oats and rye, precooked barley, and rice. These cereal grains can be milled into flours and mixed with water to form a dough. However, dough pieces made from such grains do not expand when fried to form a desirable porous texture; but instead they form a non-porous, flinty product that is undesirable as a snack food.

It would be desirable to produce fried snacks from mixtures of dry cereal ingredients not normally used for snack foods to form fried snack products which are well expanded with uniform porosity, are not brittle and have acceptable fat content. It would be particularly desirable to produce corn snacks and other cereal grain snacks that can be extruded and fried at moisture levels about 40%, while avoiding intermediate treatment, such as moisture content reduction before frying. It would also be desirable to produce an extruded fried corn snack with a characteristic full corn flavor from a variety of non-lime-treated dry corn products. The prior art has not suggested how to produce a corn-based fried snack with uniform porosity and expansion and reasonably low fat content. To produce fried snacks from corn processed by dry-milling avoids the more cumbersome and time-consuming process of preparing freshly-ground masa. It also can eliminate the stream pollution and the costly waste treatment facilities required when making snacks from lime-treated corn kernels.

The method of this invention provides extruded fried corn snacks that overcome the problems described above. In addition, the method provides novel fried snack products made from cereal grains and flours heretofore not used for commercial snack foods.

SUMMARY OF THE INVENTION

Briefly, one embodiment of this invention provides a method for making an expanded cereal-based fried snack product, comprising the steps of preparing a dough from dry solids consisting essentially of (a) one or more raw or partially gelatinized cereal flours providing a low water absorption component, as defined herein, comprising from about 15% to about 80%, by weight of the total dry solids; (b) one or more pregelatinized cereal starches or flours providing a high water absorption component, as defined herein, comprising from about 3% to about 40%, by weight of the total dry solids; and (c) a raw starch component comprising one or more ungelatinized starches comprising from about 10% to about 45%, by weight of the total dry solids in the dough. The dry solids are combined with water to form a moist, cohesive dough having a moisture content from about 40% to about 50%, by weight of the dough. A dough piece formed by extrusion from the dough is fried in hot cooking oil to form a uniformly expanded fried snack product that expands from about 1.2 to about 3.0 times its original thickness during the frying step.

The high water absorption component has a Modified Bostwick Index (M.B.I.), as defined herein, less than about 15 cm., normally about 12 cm. or less, where the M.B.I. is a convenient measurement of the water absorption of starch containing materials at room temperature. The low water absorption component has an M.B.I. higher than about 20 cm., normally above 25 cm. Raw starches (and certain raw flours which can provide the starch component of this process) have essentially no water absorption at room temperatures and therefore have an essentially infinite M.B.I.

The combination of these three components in the dough piece at the time of frying is critical to this process. The low water absorbing cereal flour provides the necessary flavor, fiber and structure of the fried snack, but the low water absorbing component, in and of itself, will dehydrate too rapidly in the fryer and not form the desired snack structure. The high water absorbing component retains the water in the formed dough piece as the temperature increases during frying. At the the gelatinization temperature, sufficient water is therefore present in the dough to allow the residual raw starch contained in the low water absorbing component and in the raw starch component to absorb water when the dough reaches the gelatinization temperature and gelatinize the residual raw starch. This controlled expansion forms the desired well expanded, uniformly porous fried snack.

The method is particularly useful in making corn-based snack products from a variety of dry-milled, non-lime-treated whole corn flours as well as from standard masa flours.

These and other aspects of the invention will be more fully understood by referring to the following detailed description.

DETAILED DESCRIPTION

This invention generally provides a method for making a fried, expanded cereal grain-based snack product by forming a dough from a combination consisting essentially of (1) a low water absorption component comprising one or more low water absorptive, cereal flours or ground whole grains for providing the flavor, appearance and fiber components of the snack; (2) a high water absorption component comprising one or more pregelatinized cereal starches or flours having a high water absorbing capacity; and (3) a raw starch component comprising one or more ungelatinized starches. The dry components are mixed with water to form a dough, and the dough is extruded to form dough pieces which are fried to form uniformly expanded fried snacks. Extrusion can be with a piston-type extruded or an impeller screw-type extruder.

The high water absorption component has a selected water absorption range, such that when this component is combined in the desired ratio with the low water absorptive cereal flour, the raw starch and water, the extruded pieces, when fried, expand within a controlled range. This produces a snack with a desirable expansion, uniform porosity and controlled absorption of fat. The dough pieces are fried in hot cooking oil immediately after extrusion, without any intermediate treatment that would appreciably alter their moisture content following extrusion, to form the fried snack.

The degree of expansion of the extruded dough piece during frying is controlled by the composition of the dough at the time of frying, and particularly at the time the components reach the gelatinization temperature, so that the dough piece expands with an expansion ratio generally in the range of from about 1.2 to about 3.0-to-1, i.e., the thickness of the finished product is from about 1.2 to about 3.0 times the die width of the extruder during the extrusion step. A fried product having an expansion ratio lower than the minimum desired expansion ratio generally is unacceptable because of its hard, horny consistency. The degree of expansion can also be affected by the type of extrusion. Expansion as low as 1.2 to 1 is generally acceptable for products formed as a thin strand by screw impeller extrusion. Products formed by piston extrusion are generally not acceptable when expansion is less than 1.8 to 1. In all cases, the finished product of the method has a uniformly porous or cellular interior structure, avoiding the uneven expansion and large blistered areas found in prior art products. For instance, the structure of these products is observably different from those disclosed in U.S. Pat. No. 3,886,291 to Willard, in which the extruded potato snack product has a porous internal structure encased in a dense exterior layer of substantially reduced porosity. The uniform expansion and amount of expansion also differ from the fried corn chips commonly sold under the trademark Fritos.

According to one practice of this invention, novel corn-based fried snack products are produced from a variety of dry-milled, non-lime-treated corn ingredients. These fried products are produced from a variety of low water absorptive corn flours or ground whole corn kernels, from which it has not previously been thought possible to produce expanded corn snacks with uniform porosity and expansion and with reasonably low fat content. In describing the invention with respect to such corn ingredients, the following definitions are used.

"Whole corn flour" refers to corn flour having an approximate analysis similar to whole corn kernels, not treated with lime during processing, but subjected to sufficient heat treatment to partially gelatinize the starch contained in the kernel and inactivate the enzymes so that the final milled dried whole corn flour can be stored indefinitely without rancidity. It normally contains about 4.5% to 4.8% fat, 3.4% fiber, 10.8% protein, and 1.3% ash.

"Masa flour" is lime-treated partially cooked corn that has been dried and ground to a flour for use in Mexican foods and traditional corn snacks.

"Corn flour" is raw, dry-milled corn recovered from the endosperm (the starchy, low-fiber component) of the kernel during the conventional dry milling procedure. It typically contains about 1.0% to about 2.0% fat, 0.4% fiber, 6.7% protein, and 0.4% ash. Corn flour is sifted through a 60-mesh (250 micron) screen and has been subject to no heat treatment during processing.

"Pregelatinized corn flour" is similar in composition to corn flour, except that the corn has been subjected to sufficient moist heat treatment during processing to gelatinize a portion of the starch, thereby increasing the water absorption of the flour. Pregelatinized corn flours are available in varied degrees of water absorption capacity and methods of manufacture.

Generally, the high water absorption component, abbreviated herein is "HIWAC", most generally comprises from about 3% to about 40%, by weight, of the total dry solids present in the dough. Optimum results are obtained when the HIWAC is present in the dough in the range from about 15% to about 35%, by weight, of the total dry solids, with piston extrusion in which there is practically no shear in the dough. If an impeller screw-type extruder is used, which creates shear in the dough because of intensive mixing, less of the HIWAC component can be used. In this instance, a practical range is about 3% to about 25% HIWAC. The purpose of the HIWAC is to retain water in the formed dough piece as temperature is increasing during frying to gelatinize the raw starch present in the dough at the time the dough piece reaches the gelatinization temperature. The HIWAC thus expands to establish the porous structure of the fried snack, and essentially holds the dough ingredients together during expansion in the fryer. The HIWAC is selected from one or more ingredients comprising pregelatinized (precooked) cereal flours or starches dehydrated potatoes, or any other dry, particulate, highly water absorptive (as defined herein), precooked, low fiber food ingredient capable of expanding and holding the dough ingredients together during frying. These functions of the HIWAC are best carried out by the ingredients selected from the group consisting of pregelatinized corn flour, potato flakes, potato flour, potato granules, and rice flour or mixtures thereof.

The low water-absorption cereal-based component, abbreviated herein as "LOWAC", consists of one or more raw or partially gelatinized dry-milled cereal flours or ground whole cereal kernels with substantially lower water-holding ability (water absorption) than the HIWAC, wherein the water absorption is measured from room temperature to the gelatinization temperature of the ingredients. The LOWAC provides the flavor and fiber constituents for the snack, but it typically does not, in and of itself, hold water sufficiently to form a dough that can be used on a commercial basis for making fried snacks. Most generally, the LOWAC is present in the formulation from about 15% to about 80%, by weight, of the total dry solids present in the dough. Optimum results are obtained when the LOWAC is present from about 35% to about 70%, by weight, of the total dry solids. When combined with the HIWAC and mixed with the desired amount of raw starch and water, a smooth, cohesive dough of uniform composition is formed. This dough can be conveniently shaped by conventional batch or continuous extrusion equipment. The LOWAC ingredients have been subjected to minimum gelatinization (they are either raw or only partially gelatinized) and therefore most of the starch in the LOWAC can absorb more water if more water is present at the time the ingredients reach the gelatinization temperature. The HIWAC, being present in the dough with its higher water absorbing ability at the time the gelatinization temperature is reached, retains sufficient water to be available for absorption by the LOWAC at the gelatinization point. This allows the dough to expand during gelatinization and form a uniformly porous structure throughout the snack. The LOWAC can be provided, at least in part, by a raw flour, such as corn flour, in which raw starch is available to gelatinize when the dough is fried and thus assist in forming the desired uniform porosity of the finished fried snack. LOWAC flours also can be prepared from steam-rolled or extruded grains that are partially gelatinized, but have a low water absorption, such as wheat (bulgar) flour, oat flour, barley flour, or mixtures thereof. Soy flour, rye flour, and rye flakes also can be used as a LOWAC ingredient. Particularly significant cereal flours for use in making fried snacks are partially gelatinized whole corn flours, such as those made by the process of Wimmer, U.S. Pat. No. 3,404,986, or Stickle, U.S. Pat. No. 4,089,259, in addition to dried masa flours prepared from lime-treated whole corn.

Many factors influence the ability of a dry particulate foodstuff, such as a cereal flour or starch, to absorb or "hold" water at room temperature. Extremely fine particles of raw starch entrap a small amount of water only by surface tension absorption, but this small amount of water is loosely held, at room temperature. Flours, such as wheat flour and oat flour, can absorb water by hydration of the undenatured proteins and other non-starch components. However, the same starch molecules can absorb many times their weight in water during gelatinization (at higher temperatures). The temperature at which a cereal flour in contact with an excess of water exhibits a rapid increase in viscosity during heating (gelatinization) is determined by the nature of the starch. That is, different cereal grains have different gelatinization temperatures, and higher viscosity is directly proportional to greater water holding ability. For cereal grains, the starches normally gelatinize over the range of 50° to 75° C.

The water-absorbing (or viscosity) characteristics of four classes of ingredients used in this process can be accurately measured by an instrument such as the VISCO/amylo/Graph by C. W. Brabender Instruments, Inc. This is a fully recording instrument for measuring and recording apparent vicosity at constantly varying temperatures. A suspended sensing element immersed in the material under test is connected through a measuring spindle to a sensitive recording system. For gelation studies, a thermoregulator controls the temperature which is programmed to increase at the rate of 1.5° C. per minute form 25° C. to 95° C.

The drawing shows Brabender curves, measured in Brabender units of viscosity versus cooking time, determined for four exemplary materials, using a mixture of nine parts water to one part solids (moisture-free basis), or 10% solids. These examples illustrate the water absorbing characteristics of the four classes of food ingredients used in this process; and as shown in the drawing, each class of food ingredients has a different viscosity (or water-absorbing ability) as cooking time (and temperature increases. The four classes of food ingredients illustrated in the drawing are:

A. Example of a high water-absorption component (HIWAC), pregelatinized corn flour, Table 1, No. 3 below;

B. Example of low water-absorption cereal flour (LOWAC), partially gelatinized whole corn flour, Table 2, No. 5, below;

C. Example of a LOWAC, raw corn flour, Table 2, No. 13, below; and

D. Example of raw starch, amioca starch.

As illustrated in the drawing, highly gelatinized or HIWAC ingredients (A) have a higher initial viscosity which diminishes as the product is stirred and heated due to the physical breakdown of the gel as a result of the continued mixing. This is followed, in most cases, by a slight increase in apparent viscosity at the gelatinization temperature as the starch molecules absorb a final increment of water. The HIWAC contains very little raw starch but does exhibit some increase in viscosity when heated above the gelatinization temperature, which, in the drawing, is at about 28 minutes cooking time.

Partially gelatinized LOWAC cereal flours (B), including those of major interest in producing the novel snacks of this process, exhibit a relatively low viscosity on initial mixing, followed by a moderate increase in viscosity as the raw starch contained in the particles reaches the gelatinization temperature. Raw cereal flours (C) also exhibit a relatively low viscosity at low temperatures, followed by a more rapid increase in viscosity at low temperatures, followed by a more rapid increase in viscosity as the starch reaches the gelatinization temperature.

Raw cereal starches (D), show the most rapid increase in viscosity on gelatinization. The rate of increase of viscosity is highest in this class of ingredients, since the pure starches have been thoroughly separated from the other components of the cereal grains and thus can absorb water and swell without restriction.

Thus, the HIWAC provides a greater water-absorbing capability than the LOWAC or the raw starch during frying until the dough reaches the gelatinization temperature. At that point, the raw starch and the raw flour, and to some extent the pregelatinized flour, absorb the water retained by the HIWAC and become gelatinized sufficiently to expand and form a porous snack structure.

I have discovered that prior attempts to utilize ungelatinized or partially gelatinized cereal flours for the preparation of fried expanded snacks have been limited by the tendency of dough pieces formed from these ingredients to lose water too quickly during frying. If the evolution of water during frying dehydrates the dough piece at too rapid a rate, by the time the internal temperature of the piece reaches the gelatinization temperature of the starch, insufficient water remains in the dough piece to permit the remaining starch to absorb the water and encapsulate the steam-filled voids within the dough piece to form the desired snack structure. However, I have discovered that the HIWAC present in the dough during frying significantly slows the evolution of water from the formed dough piece after it is deposited in the frying fat. This retains sufficient water in the dough piece to hydrate the residual ungelatinized starch in the dough piece at the time it reaches the gelatinization temperature, forming a well expanded and uniformly porous fried snack.

If certain LOWAC ingredients are present in a high enough quantity in the dough, together with a very highly water-absorbent HIWAC, it may be possible that no additionalonal raw starch would be required for forming the desired snack product, defined herein as a well-expended (expansion ration of about 1.2 to 3.0-to-1), non brittle, uniformly porous, fried piece with acceptable fat content (less than about 30%). However, most LOWAC cereal flours do not exhibit sufficient raw starch binding power (as exhibited by a rapid increase in viscosity during gelatinization) to form the desired structure. Raw starches, in contrast, absorb water quickly from the formed dough piece as internal temperature rises rapidly to its gelatinization temperature. The affinity for water of the gelatinizing starches is so great that the bubbles of steam formed from the evaporation of water become entrapped uniformly throughout the dough piece in a network of firm starch gel which creates the uniformly porous structure of the finished fried snack.

For this reason, it is particularly advantageous that a portion of the dry starch-containing solids in the dough be in the form of a pure raw starch, most generally in the amount from about 10% to about 45%, by weight, of the total dry solids present in the dough. Corn, potato, tapioca, and amioca starch, or mixtures thereof, have been found acceptable raw starches for these snack products; but any pure starch or modified starch exhibiting a rapid increase in viscosity on gelatinization, including some LOWAC raw flours, can be satisfactory. Starches do not brown during frying as do ingredients containing sugars or proteins; hence, their presence in the formulation is useful in reducing the tendency of the snack products to scorch when fried. Another advantage of using a raw starch in the dough is the reduction of overall viscosity or cohesiveness of the dough, which facilitates extrusion at more desirable lower pressures.

I have discovered that it is possible to use a simple measurement of water-holding ability or absorption of snack ingredients to classify them as the HIWAC ingredients capable of forming a workable snack dough when combined with the appropriate quantity of the cereal-based LOWAC ingredients and the raw starch.

The dilution used in the Brabender method (9:1) is too great for differentiating the initial room temperature absorption of these ingredients. Instead, if the quantity of water is reduced to 4:1, based on the weight of the ingredient at its normal moisture content, a modification of the widely-used Bostwick method can be used for differentiating the water absorption of the HIWAC from the LOWAC ingredients. Generally, this method consists of making a water slurry of the flour to be tested, placing a given quantity of the flour in an open-bottom container on a flat surface, removing the container, and, in a selected period of time, measuring the diameter of the resulting mass. The method, as modified for ingredients used in this process, is as follows:

Place 400 ml. of water at 25° C. in an 800 ml. glass beaker. Gradually add 100 gm. of the flour while stirring vigorously with a wooden-handled spatula with a 5 in. steel blade. Then stir gently for 3 min., using a spatula to smooth any lumps that may form. Mixing may be done using a Hobart Model N-50 blender, slow speed, or equipment giving equivalent results. Allow the slurry to stand an additional 2 min. for hydration. Then stir gently for about 1 sec. with the spatula, using the Hobart blender, for example. Place a 45×45 cm. glass plate over a paper measuring scale and center a 7.25 cm.-diameter (internal), open-bottom, cylindrical container, exactly 7.5 cm. high, over the scale. Transfer the slurry to the container which is resting the vertical position on the flat glass plate. Transfer the slurry until the container is filled higher than its top level. Strike off the excess with a straight edge. Allow the slurry to rest for 30 sec. as a patty forms on the glass plate. Then remove the container from the glass plate with a vertical pull, avoiding lateral motion. Allow any remaining contents of the container to drain onto the patty for 10 sec. After waiting 1 min. for the size of the patty to reach equilibrium, read its diameter to the nearest millimeter, as shown on the scaled measuring sheet underneath the glass plate.

The results of these test, referred to herein as the Modified Bostwick Index (M.B.I), for high water-absorption components that can be used in the dough, are presented in Table 1 below, in which the index is expressed in centimeters.

TABLE 1

MODIFIED BOSTWICK INDEX
FOR INGREDIENTS WITH HIGH WATER ABSORPTION
(HIWAC)

| No. | Ingredient | Cm. |
|---|---|---|
| 1. | Corn Flour, Precooked No. 1 (ICM 820)* | 8.0 |
| 2. | Corn Flour, Precooked No. 2 (ICM 965)* | 12.0 |
| 3. | Corn Flour, Precooked No. 3 (ICM 875)* | 8.3 |
| 4. | Corn Starch (pregelled)(American Maize 721A) | 11.0 |
| 5. | Potato Flakes (20-mesh) | 8.0 |
| 6. | Potato Flour (80-mesh) | 8.5 |
| 7. | Potato Granules (normal absorption) (AMPCO)** | 10.0 |
| 8. | Rice Flour (Instant Rice Flour-40) | 10.5 |

*ICM - Illinois Cereal Mills
**AMPCO - American Potato Co.

The Modified Bostwick Index for typical cereal-based low water-absorbing components are presentd in Table 2 below.

TABLE 2

MODIFIED BOSTWICK INDEX
FOR CEREAL INGREDIENTS WITH LOW WATER
ABSORPTION (LOWAC)

| No. | Ingredient | Cm. |
|---|---|---|
| 1. | Barley Flour (Pregel.) (Minnesota Grain Pearling Co.) | 34.0 |
| 2. | Bulgur Flour (20-mesh) (California Milling Corp.) | 26.5 |
| 3. | Bulgur Flour (20-mesh) (Fisher Ala) | 29.0 |
| 4. | Bulgur Cracked (16-mesh) | 35.0 |
| 5. | Corn Flour, whole, No. 1 (Krause PCM) | 28.5 |
| 6. | Corn Flour, whole, No. 2 (Mountain Milling) | 45.0± |
| 7. | Corn Flour, whole, No. 3 (Mountain Milling) | 26.0 |
| 8. | Corn Flour, whole, No. 4 (Mountain Milling) | 40.6 |
| 9. | Corn Flour, Masa, No. 1 (Valley Grain No. 7) | 36.0 |
| 10. | Corn Flour, Masa, No. 2 (Valley Grain No. 2) | 33.5 |
| 11. | Corn Flour, Masa, No. 3 (Maseca No. 6) | 38.5 |
| 12. | Corn Flour, Masa, No. 4 (Maseca white) | 26.0 |
| 13. | Corn Flour, raw (ICM 505) | 45.0± |
| 14. | Oat Flour (Quaker) | 33.0 |
| 15. | Rye Flakes (Conagra rolled rye (Fruen Milling Co.) | 25.0 |
| 16. | Rye Flour (Fisher) | 33.0 |
| 17. | Soy Flour (Soya Rich & Soya Fluff (Central Soya) | 29.5 |
| 18. | Soy Flour (Staley F-200) | 33.0 |
| 19. | Soy Flour (Staley I-200) | 25.0 |

Some ungelatinized or raw cereal flours do not absorb the water in this test, since the water spreads completely over the glass. Any flour or starch with a reading over about 45 cm. may be classified as an extremely LOWAC raw flour or as a raw starch for the purpose of this process.

By combining (1) about 3% to 40% of the HIWAC ingredients shown in Table 1 with (2) about 15% to 80% of the less absorptive LOWAC ingredients shown in Table 2 and (3) about 10% to 45% raw starch, a dough can be formed with about 40% to 50% water that can be easily shaped by extrusion into small pieces. The HIWAC ingredients are those having an M.B.I. of less than about 15 cm., normally about 12 cm. or less. The LOWAC ingredients are those having an M.B.I. higher than about 20 cm., normally above 25 cm.

When the dough pieces are fried they produce uniformly expanded snack products with a highly desirable texture and flavor. The 40% to 50% water content is based on the weight of the dough. The quantity of water added to the formula to achieve the consistency desired for the dough and the type and degree of mixing employed is dependent on the net absorption of the total dry ingredients and the type of extrusion process being used. The quantity of water added can be adjusted by those skilled in the art to provide optimum forming production rate and product quality.

Other methods of absorption measurement for the cereal flours also can be adopted by those skilled in the art, such as a Brookfield viscosimeter fitted with a helipath stand. However, the Modified Bostwick method has been found to be quite reproducible and is well adapted for routine measurement by laboratory and plant personnel evaluating ingredients for snack production.

Other features of the process will be evident from the more detailed discussion of the following examples of the process.

Corn-Based Snacks

In one practice of this invention, novel fried corn-based snacks are made from dry corn-based solids in which one or more whole, non-lime-treated corn flours constitute the major portion of the dry solids in the dough. Generally, the whole corn flour used for making this snack has the full characteristic corn flavor desirable in the finished corn snack product. In another practice of the invention, novel fried corn-based snacks are made from dry corn-based solids that include masa flour. It is desirable that the corn-based solids constitute a major portion (at least more than 50%) of the dry solids in the dough, to provide the desired corn flavor.

EXAMPLE 1

According to a laboratory procedure for making extruded corn rings, a blended mixture of the following dry ingredients, expressed as a percentage, by weight, of the total dry solids in the mix, was used:

| Ingredient | Type | Wt. % | Totals Type | Wt. % |
|---|---|---|---|---|
| Whole Corn Flour (1) | LOWAC | 51.5 | | |
| Pregel. Corn Flour (2) | HIWAC | 18.4 | HIWAC | 18.4 |
| Amioca Starch | Starch | 16.5 | LOWAC | 51.5 |
| Corn Starch | Starch | 9.0 | Starch | 25.5 |
| Vegetable Oil | | 2.7 | | |
| Salt | | 2.0 | | |
| Lecithin | | 0.3 | | |
| Water, % of dry ingredients, 65% | | | | |
| Dough Moisture, 45% | | | | |

300 gm. of the mixture was placed in the bowl of a Hobart N-50, 5-quart mixer and blended with 195 ml. of water for 60 sec. at 60 rpm using a standard flat paddle. At this point, the materials formed a single, cohesive ball. The paddle was replaced with a dough hook, and mixing was continued at 109 rpm for 4 Min. to form a cohesive, non-sticky mass. The dough was transferred to a hand-operated piston extruder fitted with a die to make a ridged, cylindrical snack product of 17.78 mm. outside diameter, with an aperture of 0.89 mm. at the base of the ridges and 1.32 mm. at the maximum width of the ridges, similar to die No. 116, Maldari & Sons. As the product was extruded, it was cut into rings approximately 1 cm. long, which were deposited in a deep-fat fryer and fried in vegetable oil at 175° C. for about 90 sec. The fried product was removed from the frying oil, cooled, salted, and found to have a pleasant corn flavor, light expanded structure, with uniform porosity throughout, and an expansion ration of 2.26.

The fried product was then examined by an expert panel to determine a quality rating based on shape, surface, structure, puffing and expansion. Each attribute was rated on a nine point scale in which 1=very good, 3=good, 5=fair, 7=poor, and 9=very poor. Because of the importance of structure to overall product quality, particularly texture, the structure rating was multiplied by a factor of three; the surface; puffing and expansion ratings were multipled by a factor of two; and the shape rating was multiplied by a factor of one, thus increasing the range of total score from 10=very good to 90=very poor. The panel ratings were 2, 2, 1, 2, 2, in order, for the attributes described above, giving an extremely good final score of 2+4+3+4+4, or 17.

Additional experiments were made to measure the effect of the level of HIWAC in the formula by adjusting the level of the pregelatinized corn ingredient. A corresponding decrease was made in the whole corn flour LOWAC ingredients.

The effect on the quality of the snacks is shown below, in which the amount of HIWAC is based as the total dry solids in the dough.

| HIWAC (%) | 0 | 5 | 10 | 18 | 25 | 50 |
|---|---|---|---|---|---|---|
| Shape | 5 | 4 | 2 | 2 | 3 | 5 |
| Surface | 6 | 4 | 2 | 2 | 2 | 2 |
| Structure | 6 | 5 | 2 | 2 | 3 | 4 |
| Puffing | 4 | 3 | 2 | 4 | 6 | 6 |
| Expansion | 4 | 3 | 2 | 2 | 2 | 3 |
| SCORE | 49 | 39 | 20 | 24 | 32 | 39 |

A trained panel examined the corn-based products in this series and concluded that the texture of products containing less than 10% HIWAC were hard, brittle and commercially unacceptable, and that the flavor of the product with the 50% HIWAC was no longer representative of the desired whole corn flavored snack and, in addition, was excessively puffed.

A similar group of tests were made in which the level of starch in the formula was varied from 0 to 50%, based on the total dry solids in the dough. No satisfactory product was made with 10% starch or below; and at the 50% level, the flavor of the finished snack was noticeably diminished. While functionally stable products could be made at levels of starch as high as 50%, such products were undesirable, because of hard texture and poor flavor.

| STARCH (%) | 10 | 25 | 50 |
|---|---|---|---|
| Shape | 6 | 3 | 4 |
| Surface | 5 | 3 | 2 |
| Structure | 8 | 2 | 3 |
| Puffing | 8 | 4 | 3 |
| Expansion | 7 | 2 | 2 |
| SCORE | 70 | 27 | 27(a) |

(a) hard texture, poor flavor.

EXAMPLE 2

Using the extrusion process similar to the method in Example 1, fried corn snacks were made from dry solids consisting only of a commercial sample of LOWAC pregelatinized whole corn flour, Table 2, No. 5, having an analysis of 4.7% fat, 10.8% protein, 3.4% fiber, and 1.3% ash. Four separate samples of the dough, series A, were prepared, having a moisture content of about 35, 40, 45, and 50%, by weight. It was found that these doughs ranged, in order, from a friable, but not uniform, mixture that could be pushed together into shape only with great difficulty, to a cohesive rubbery state, and finally into a slightly sticky soft ball. Each sample was carefully fried Under the same conditions, and the total frying time was noted.

A separate portion of the same whole corn flour was blended with a HIWAC component, a pregelatinized corn flour having a Bostwick Index of 12 cm., Table 1, No. 3. The whole corn flour and the HIWAC component were mixed in a ¾-¼ proportion. The blended mixture was used in a similar manner, as described above, to produce fried corn snacks, series B, from doughs containing 40, 45, and 50% moisture. The sample containing 35% moisture was too stiff to extrude.

A third set of samples, series C, was made from a mixture containing 50% of the same pregelatinized whole corn flour, 25% of the pregelatinized corn flour, from series B, and 25% amioca starch.

The test samples are summarized below:

| Ingredients (%) | Samples | | |
|---|---|---|---|
| | A | B | C |
| LOWAC | 100 | 75 | 50 |
| HIWAC | 0 | 25 | 25 |
| Starch | 0 | 0 | 25 |

The results of these tests are shown in the following table:

| | Dough Moisture % | | | | |
|---|---|---|---|---|---|
| | 35 | 40 | 45 | 50 | 45 |
| Dough Temperature °F. | 80° | 80° | 80° | 80° | 100° |
| Fry Time/Seconds | | | | | |
| Series A | 85 | 87 | 110 | 145 | 90 |
| Series B | — | 116 | 145 | 180 | 135 |
| Series C | — | 128 | 201 | 237 | 144 |
| Increase in Fry Time % | | | | | |
| Series B vs. A | — | 33 | 32 | 24 | 51 |
| Series C vs. A | — | 47 | 83 | 63 | 60 |
| Expansion Ration | | | | | |
| Series A | 1.78 | 1.85 | 1.82 | 2.15 | 1.81 |
| Series B | 1.78 | 2.18 | 2.16 | 2.36 | 2.02 |
| Series C | 1.78 | 2.00 | 2.27 | 2.70 | 2.02 |
| Score | | | | | |
| Series A | 50 | 56 | 43 | 52 | 48 |
| Series B | — | 49 | 34 | 55 | 34 |
| Series C | — | 41 | 28 | 39 | 24 |
| Fat Content, % | | | | | |
| Series A | — | — | 26 | — | 21 |
| Series B | — | — | 24 | — | 22 |
| Series C | — | — | 28 | — | 23 |

When compared with the frying time and expansion of the snack containing only LOWAC whole corn flour, the addition of the HIWAC ingredients increased the frying time of the snack about 24% to 33%, and the HIWAC increased the expansion of the product about 10% to 19%. A further increase in the frying time and improvement in overall score was noted with the addition of the raw starch. In spite of the increased time of frying, it was noted that the fat content of these samples was not substantially higher than the product made with LOWAC whole corn flour alone.

An additional experiment was conducted at 45% dough moisture in which warmer water was added to produce a dough with a final temperature of 100° F. As shown in the table, the frying time was noticeably less with this product, as was the final expansion. However, the overall quality score of Series C, the preferred formulation, was improved as a result of a smoother surface and improved shape and structure.

EXAMPLE 3

Using the extrusion process similar to the method in Example 1, fried tortilla-flavored corn snacks were made from a commercial sample of LOWAC masa flour, known as Tortilla No. 7, produced by Valley Grain Driers, Madera, California (Table 2, No. 9). Samples were made corresponding to Series A, B, and C in Example 2, each having a dough containing 45% moisture, the optimum determined in Example 2. Each sample having the identical number of extruded rings was carefully fried in the batch fryer under the same conditions at 350° F., and the total frying time was then recorded. The fried products were measured, as described in Example 2, with the following results:

|  | Sample A | Sample B | Sample C |
|---|---|---|---|
| Dough moisture | 45% | 45% | 45% |
| Frying time, seconds | 83 | 106 | 118 |
| Increase in fry time | — | 28% | 42% |
| Expansion ratio | 1.39 | 1.61 | 1.86 |
| Score | 62 | 50 | 30 |
| Fat content | 25% | 20% | 21% |

Results of this example showed (even more conclusively than Example 2) the advantage of adding a HIWAC ingredient to improve the expansion and overall quality of the fried snack. The addition of raw starch provided an additional improvement and produced a final product with a good score of 30. The product of Sample C had a delicate Mexican flavor and, owing to the uniform porous structure throughout the snack, a tender eating quality unlike any known fried snacks produced from ground corn masa or masa flours.

Snacks From Various Cereal Flours

The flavor of snacks made from corn flours can be altered in a novel manner by incorporation other cereal grain flours, such as oat flour or bulgur flour.

EXAMPLE 4

Fried snacks of corn, with oat and bulgur flour, were made by the same extrusion techniques, using the following ingredients:

| Ingredient | Type | Wt. % | Totals Type | Wt. % |
|---|---|---|---|---|
| Pregel. Corn Flour (2) | HIWAC | 27.0 | | |
| Corn Flour | LOWAC | 25.0 | HIWAC | 27.0 |
| Amioca Starch | Starch | 25.0 | LOWAC | 40.0 |
| Oat Flour | LOWAC | 10.0 | Starch | 25.0 |
| Bulgur Flour | LOWAC | 5.0 | | |
| Sugar | | 3.0 | | |
| Vegetable Oil | | 2.7 | | |
| Salt | | 2.0 | | |
| Lecithin | | 0.3 | | |
| Water, % of dry ingredients, 67% | | | | |
| Dough Moisture, 45% | | | | |
| Expansion ration 2.0 | | | | |
| Score 29 | | | | |

EXAMPLE 5

Fried snacks of rice and whole corn flour were made by the same extrusion techniques, using the following ingredients:

| Ingredient | Type | Wt. % |
|---|---|---|
| Precooked Rice | HIWAC | 36.0 |
| Whole Corn Flour (1) | LOWAC | 34.0 |
| Amioca Starch | Starch | 25.0 |
| Vegetable Oil | | 2.7 |
| Salt | | 2.0 |
| Lecithin | | 0.3 |
| Water, % of dry ingredients, 67% | | |
| Dough Moisture, 46% | | |
| Expansion ration 2.2 | | |
| Score 23 | | |

EXAMPLE 6

Fried snacks of oats and corn flour were made by the same extrusion techniques, using the following ingredients:

| Ingredient | Type | Wt. % |
|---|---|---|
| Oat Flour | LOWAC | 36.0 |
| Pregel. Corn Flour (2) | HIWAC | 34.0 |
| Amioca Starch | Starch | 25.0 |
| Vegetable oil | | 2.7 |
| Salt | | 2.0 |
| Lecithin | | 0.3 |
| Water, % of dry ingredients 67% | | |
| Dough Moisture, 46% | | |
| Expansion ration 1.94 | | |
| Score 22 | | |

EXAMPLE 7

To test the effect of other HIWAC ingredients, fried snacks were made by the same extrusion techniques, using a combination of the following ingredients:

| Ingredient | Type | Wt. % | Totals Type | % |
|---|---|---|---|---|
| Whole Corn Flour (1) | LOWAC | 33.0 | | |
| Potato Flakes (920-mesh) | HIWAC | 27.0 | HIWAC | 33.7 |
| Amioca Starch | Starch | 20.0 | LOWAC | 44.3 |
| Corn Flour | LOWAC | 11.3 | Starch | 20.0 |
| Pregel. Corn Flour | HIWAC | 6.7 | | |
| Salt | | 1.5 | | |
| Monoglyceride Emulsifier | | 0.3 | | |
| Monosodium Glutamate | | 0.2 | | |
| Water, % of dry ingredients, 67% | | | | |
| Dough Moisture, 46% | | | | |
| Expansion ratio 1.86 | | | | |
| Score 27 | | | | |

300 gm. of this mixture was mixed with 195 gm. of water, as described in Example 1. The extruded product was examined, and although it had good structure, the flavor was not as typical as would be expected from a cereal-based snack, due to the presence of the potato solids. However, the examples illustrate that a minor amount of gelatinized potato ingredients can be added to the dough to obtain a desired structure in a cereal-based snack.

In a second experiment in this series, the formula was adjusted to make a less expanded, crisper product by reducing the level of flakes to 18%, eliminating pregelatinized corn flour, and adding 20% corn starch. The expansion decreased to 1.58, but the shape, surface structure, and other attributes of the product were excellent.

EXAMPLE 8

| Ingredient | Sample Type | A Wt. % | B Wt. % | Type | TOTALS A % | TOTALS B % |
|---|---|---|---|---|---|---|
| Potato Starch | Starch | 43.8 | 43.8 | HIWAC | 0.0 | 9.1 |
| Bulgur | LOWAC | 36.5 | 27.4 | LOWAC | 54.7 | 45.6 |
| Corn Flour, raw | LOWAC | 18.2 | 18.2 | Starch | 43.8 | 43.8 |
| Potato Flakes | HIWAC | 0.0 | 9.1 | | | |
| Salt | | 1.5 | 1.5 | | | |
| Water, % of dry ingredients | | | | | | |
| Sample A 94.9 | | | | | | |
| Sample B 94.9% | | | | | | |
| Expansion Ratio | | | | | | |
| Sample A 1.26 | | | | | | |
| Sample B 1.53 | | | | | | |
| Score | | | | | | |
| Sample A 42 | | | | | | |
| Sample B 30 | | | | | | |

A bulgur snack was prepared from a formula similar to Sample A, Example 2, which contained no HIWAC ingredient. The mixture, referred to as Sample A in the table above, was prepared as described in Example 1 and extruded through a smooth cylindrical die having an outer diameter of 15.84 mm. and an opening of 1.13 mm. The product expanded to only 1.26 times this dimension, and although it had a crispy texture, it was not considered acceptable. The formula of Sample A was altered, in Sample B herein, by adding 9.1% potato flake HIWAC ingredient, which increased the expansion to 1.53 and produced a very desirable product with a novel flavor with recognizable elements of wheat, corn, and potato.

EXAMPLE 9

| Ingredient | Type | Wt. % | TOTALS Type | % |
|---|---|---|---|---|
| Whole Corn Flour (1) | LOWAC | 27.3 | HIWAC | 22.4 |
| Pregelatinized Corn Starch | HIWAC | 22.4 | LOWAC | 44.8 |
| Amioca Starch | Starch | 20.5 | Starch | 24.8 |
| Raw Corn Flour | LOWAC | 12.5 | | |
| Oat Flour | LOWAC | 5.0 | | |
| Corn Starch | Starch | 4.3 | | |
| Sugar | | 3.0 | | |
| Vegetable Oil | | 2.7 | | |
| Salt | | 2.0 | | |
| Lecithin | | 0.3 | | |
| Water, % of dry ingredients, 67% | | | | |
| Expansion ratio 2.92 | | | | |
| Score 23 | | | | |

300 grams of this mixture were mixed with 200 grams of water, as described in Example 1. The product was extruded through the same fluted ring die, and as a result of using the pregelatinized corn flour as the HIWAC ingredient, the dough pieces expanded to 2.92 times their original dimension. The product had a light, tender texture and was judged most attractive.

EXAMPLE 10

The formulation of Example 1 was tested in the same manner with various other starches used to replace the amioca starch. Results are tabulated below. In this series of test, the same dough was used to produce smooth cylindrical rings, using the die referred to in Example 8, as well as the fluted ring die referred to in Example 1.

| Shape to Die Starch: | SCORE Smooth Cylinder | SCORE Fluted Cylinder |
|---|---|---|
| Amioca 16%, Corn 9% | 35 | 28 |
| Potato 16%, Corn 9% | 49 | 39 |
| Tapioca 16%, Corn 9% | 36 | 28 |
| Amioca 25% | 31 | — |
| Corn 25% | 41 | — |
| Potato 25% | 50 | — |
| Tapioca 25% | 36 | — |

Amioca starch is seen to have consistently higher scores in quality; however, corn and tapioca are considered equally satisfactory. While potato starch has been used satisfactorily in some formulas, such as Example 8, it is not the preferred starch for making the products of this process.

Products extruded through fluted dies consistently show better scores than comparable products extruded through smooth dies. All fried products made from formulated doughs tend to puff excessively, if the formulations are not properly adjusted, and the use of the external flutes appears to give some physical strengthening that retards this to a marked degree.

Use of Production-Scale Piston Extrusion Equipment

Previously described examples used a hand-operated piston extruder fabricated from a 2" i.d. stainless pipe, fitted with a holder for various shaped dies and a cutting wire arranged so that extruded pieces could fall directly into a batch laboratory fryer.

A vertically-arranged piston extruder, fitted with a bottom-opening die plate (as manufactured by Heat and Control for the production of standard extruded corn chips) is ideally suited for commercial production of this product. This extruder was used in the following example. A continuous piston extruder, manufactured by Marlen Research Corporation, can also be used.

EXAMPLE 11

| Ingredient | Type | Wt. % | Totals Type | Wt. % |
|---|---|---|---|---|
| Whole Corn Flour (1) | LOWAC | 27.3 | | |
| Pregel. Corn Flour (2) | HIWAC | 22.4 | HIWAC | 22.4 |
| Amioca Starch | Starch | 20.5 | LOWAC | 44.8 |
| Corn Flour | LOWAC | 12.5 | Starch | 24.8 |
| Oat Flour | LOWAC | 5.0 | | |
| Corn Starch | Starch | 4.3 | | |
| Sugar | | 3.0 | | |
| Vegetable Oil | | 2.7 | | |
| Salt | | 2.0 | | |
| Lecithin | | 0.3 | | |
| Water, % of dry ingredients, 60% | | | | |
| Dough Moisture, 43.8% | | | | |

100 kg. of the blended dry ingredients were added to a 400-quart working volume double sigma arm mixer. Water was added through a spray header with the mixer turning at 90 rpm. After 30 sec., the mixer was run at 30 rpm in reverse to thoroughly wet all particles. Mixing was then continued at low speed forward for 3 min. and 30 sec., at which time the dough was completely uniform, cohesive, but not sticky. The temperature of the dough was 26.5° C. After a 30 Min. hold time, loaves were hand-formed, approximately 9" wide and 118" in length, weighing about 30 pounds each. These loaves were hand-charged into a 10-inch diameter Heat and Control piston extruder equipped to provide 550 psi pressure on the dough. A die plate with 16 cylindrical openings was situated at the bottom of the cylinder immediately over the fryer. The diameter of the fluted cylinders was 17.78 mm., and the opening was 1.3 mm. About 2 min. and 30 sec. were required to extrude the product into the fryer, which was maintained at 180° C. During the extrusion, a single rotating wire was used to cut the extruded pieces of dough approximately 1 cm. long. The finished product was removed from the fryer in 75 sec., with a moisture content at 2% and a fat content of 25%. The product had excellent texture and eating quality.

Later experiments conducted had 55% water added to the dough based on dry solids (42% moisture) and produced a denser, harder product which contained only 21.5% fat and was judged unsaleable.

Use of Screw Impeller Extruders

Portions of previously tested formulation were extruded through typical macaroni dies using a Pastamatic pasta forming unit made by Simac Appliances Corporation. As a result of the additional shear from the rotating screw impeller, all products with the exception of the thin-stranded products described below made from the screw impeller extruder expanded more than the same products extruded through the piston extruder. In some cases undesirable puffing and blistering was noted; however, this forming unit was used with great success to produce novel fried snack products, by reducing the mixing of the dough and adjusting the formulation and water content.

EXAMPLE 12

A formulation similar to that of Example 1 was used to demonstrate production of an extruded braided product using the Pasta-matic extruder. Braids were made by extruding two long, thin strands of dough and then twisting the strands about each other to form a braid. Lecithin and oil were pre-mixed with a corn flour for three minutes at speed No. 2 in a 5-quart Hobart mixer with the wire whip attachment. The other dry ingredients then mixed for five minutes at speed No. 2 to obtain a uniform mixture. The water at 70° F. was added and mixed one minute at speed No. 1 with the paddle and then four minutes with the dough hook at speed No. 2. The dough had a moisture content of about 44%.

The dough was extruded in the Pasta-matic extruder through two round openings of 0.14 inch diameter. (The 1.625 diameter screw turned at 27 rpm.) As the strands emerged they were twisted to make a braid, but into pieces 2.5 inches long, and then fried at 350° F. for three minutes.

Further experiments were conducted by varying the level of pregelatinized corn flour over a wide range to determine the optimum for this type of extrusion apparatus. Corresponding adjustments were made in the level of raw and whole corn flour.

A new rating system was adopted for quality measurements for the braided products. As the level of HIWAC was increased in the formula, it was noted that the adhesion of the strands to each other improved, but at higher levels the identity of the individual strands was lost by the excessive expansion. At the same time, as the level of the HIWAC ingredient was reduced, the adhesion of the strands decreased, giving an undesirable tangled, non-uniform appearance. The structure of the product did no exhibit the uncontrolled puffing noted in the extruded ring-shaped products, apparently due to the relatively smaller diameter of the strand-shaped extrusion. It was noted that the product surface had a tendency to blister or show non-uniform areas, particularly if the product was tumbled, as would be the case during a seasoning operation in a conventional snack plant. The products were all tumbled and graded for surface, identity and adhesion texture and color using a nine point scale from 1=very good to 9=very poor. The adhesion and surface scores were multiplied by a factor of three, the texture score by a factor of two and the identity and color scores by a factor of one to obtain the total quality rating in which 10=very good to 90=very poor.

| Ingredient | Percent in Dry Mix | | | | |
|---|---|---|---|---|---|
| HIWAC Pregel. Corn Flour No. 2 | 0 | 3 | 6.3 | 19.8 | 50.0 |
| LOWAC | | | | | |
| Whole Corn Flour | 48.1 | 48.1 | 48.1 | 48.1 | 17.9 |
| Raw Corn Flour | 19.8 | 16.8 | 13.5 | 0 | 0 |
| Starch Amioca | 25 | 25 | 25 | 25 | 25 |
| Other | | | | | |
| Sugar | 2.9 | 2.9 | 2.9 | 2.9 | 2.9 |
| Salt | 2.0 | 2.0 | 2.0 | 2.0 | 2.0 |
| Oil | 1.6 | 1.6 | 1.6 | 1.6 | 1.6 |
| Lecithin | 0.6 | 0.6 | 0.6 | 0.6 | 0.6 |
| HIWAC | 0 | 3 | 6.3 | 19.8 | 50.0 |
| LOWAC | 67.9 | 64.9 | 61.6 | 48.1 | 17.9 |
| Starch | 25 | 25 | 25 | 25 | 25 |
| Analysis | | | | | |
| Expansion | 1.22 | 1.26 | 1.28 | 1.43 | 1.61 |
| Evaluation | | | | | |
| Adhesion | 3 | 2 | 1 | 1 | 1 |
| Identity | 3 | 3 | 3 | 4 | 7 |
| Surface | 2 | 3 | 3 | 7 | 9 |
| Texture | 3 | 2 | 2 | 4 | 6 |
| Color | 2 | 2 | 2 | 2 | 4 |
| Score | 26 | 24 | 21 | 38 | 53 |

The effect of adding increased HIWAC ingredient to the braid formulation can be seen by examining the individual product rating scores. As the level increased from 0 to 50%, expansion increased, adhesion improved, identity of individual strands worsened as the extruded soft dough pieces merged into each other, instead of appearing as two separate twisted strands the product showed a much greater tendency to blister when tumbled, although the products immediately after frying all had equally uniform surfaces with no puffing. The texture of the finished products ranged from a crisp, crunchy bite to a soft mealy consistency over this range. It was concluded that the level of the HIWAC ingredient could be adjusted within certain limits to achieve the desired appearance and texture of the finished snack product; and that the degree of agitation during application of seasoning would minimize the blistering, except in the most extreme cases. Based on this example, about 3% to about 15% HIWAC is the optimum range for products made in the screw impeller-type Pasta-matic extruder. It was concluded that about one-third as much HIWAC need be used in dough formulations using the impeller screw extender with a piston-type extruder.

EXAMPLE 13

Using the procedure of Example 12, a series of tests were made to measure the effect of the level of raw starch in the formulation and particularly to see if the level of raw starch affected the tendency of the braided products to form blistered surfaces. In this series of tests, the level of whole corn flour was adjusted to compensate for varying levels of amioca starch in the formulation. The results are shown below:

| Ingredient | Percent in Dry Mix | | | | |
|---|---|---|---|---|---|
| Starch Amioca | 0 | 5 | 15 | 25 | 35 |
| HIWAC Pregel. Corn Flour No. 2 | 6.3 | 6.3 | 6.3 | 6.3 | 6.3 |
| LOWAC | | | | | |
| Whole Corn | 73.1 | 68.1 | 58.1 | 48.8 | 38.1 |
| Raw Corn Flour | 13.5 | 13.5 | 13.5 | 13.5 | 13.5 |
| Other | | | | | |
| Sugar | 2.9 | 2.9 | 2.9 | 2.9 | 2.9 |
| Salt | 2.0 | 2.0 | 2.0 | 2.0 | 2.0 |
| Oil | 1.6 | 1.6 | 1.6 | 1.6 | 1.6 |
| Lecithin | 0.6 | 0.6 | 0.6 | 0.6 | 0.6 |
| HIWAC | 6.3 | 6.3 | 6.3 | 6.3 | 6.3 |
| LOWAC | 86.6 | 81.6 | 71.6 | 61.6 | 51.6 |
| Expansion | 1.33 | 1.34 | 1.32 | 1.28 | 1.31 |
| Evaluation | | | | | |
| Adhesion | 2 | 2 | 2 | 1 | 5 |
| Identity | 2 | 2 | 3 | 3 | 3 |
| Surface | 8 | 8 | 6 | 3 | 3 |
| Texture | 4 | 4 | 3 | 2 | 4 |
| Color | 7 | 6 | 4 | 2 | 2 |
| Score | 47 | 46 | 34 | 21 | 36 |

The results showed conclusively that a level of raw starch is essential to provide a firm structure to resist blistering during tumbling. It was concluded that the optimum range for the raw starch would be from about 10% to 35%.

EXAMPLE 14

The procedure of Example 12 was repeated with the ingredients described in Example 3. Masa flour known as Valley Grain No. 7 was blended with a pregelatinized corn flour (Table 1, No. 3), and amioca starch for samples A, B and C.

20 of each of the extruded twisted braids were collected and fried at 350° F. as previously described. The total frying time was recorded and the products were analyzed for fat, expansion and quality. The results are shown below:

| | SAMPLES | | |
|---|---|---|---|
| | A | B | C |
| Masa Flour (%) | 100 | 75 | 50 |
| HIWAC | — | 25 | 25 |
| Starch | — | — | 25 |
| Dough Moisture (%) | 45 | 45 | 45 |
| Fry Time, seconds | 150 | 185 | 245 |
| Inc. in Fry time (%) | — | 23 | 63 |
| Expansion ration | 1.14 | 1.28 | 1.33 |
| Evaluation | | | |
| Adhesion | 9 | 2 | 1 |
| Identity | 1 | 2 | 3 |
| Surface | 5 | 4 | 2 |
| Texture | 6 | 3 | 2 |
| Color | 3 | 2 | 2 |
| SCORE | 58 | 28 | 27 |

The dough made from the masa flour alone, Sample A, could not be braided commercially since the strands did not adhere during frying. Samples were produced with a variety of masa flours, including Maseca yellow and white with similar results.

During the experiments with the braid product, several observations were made:

1. Because of the extra shear created by the screw impeller type-extruder, the level of HIWAC ingredient required is lower than in piston extruded products. For example, acceptable products were made with formulations with the quantity of HIWAC ingredients as low as 3 to 5% of the total mix.

2. The expansion is lower than other shapes because of the relatively small diameter of the extruded strands. It is believed that at the moment the strands are immersed in the hot fat, the entire outer surface tends to be fixed in position, expanding with more difficulty than a flat or cylindrical shape. Further experiments demonstrated that the expansion of the product could be adjusted between 1.15 and 1.5 times the die opening. Products with expansion less than 1.15 had a hard bite and were judged unacceptable.

3. Formulations employing bulgur flour, oat flour and other ingredients indicated that the process could be adapted to a wide range of cereal flours other than corn flours.

In an attempt to make a smoother fried corn chip product, it was hypothesized that by grinding the primary whole corn ingredients relatively fine (i.e., through a standard U.S. 20 mesh or 40 mesh screen), and then uniformly gelatinizing the corn (or any other starch-containing cereal grain), the "grittiness" normally associated with corn chip products made by conventional liming processes could be overcome. Additionally, if the entire corn kernel were ground, the lime treatment normally necessary to remove the hull in conventional corn chip manufacturing processes could be avoided, thereby eliminating the lime aftertaste in such products. By using whole corn, as opposed to lime-treated de-hulled corn, the yield of a given amount of starting materials would be substantially greater and the processing difficulties encountered in conventional lime treatments could be avoided. These and additional features of such products are described in my co-pending application Ser. No. 883,519, which is hereby incorporated by reference herein.

It is to be understood that the term "corn chip" as used herein is to be viewed generically; that is, any cereal grain containing substantial portions of starch (such as wheat, barley, oats, rye or rice) may be utilized herein. While conventional manufacture of fried corn chips typically requires that the raw corn be soaked in lime water in order to soften the corn kernel hull for subsequent removal, the present process does not contemplate removing the hull, thereby eliminating the need for the lime-soaking step. The process requires that the starting cereal grain be uniformly ground to pass through a U.S. 20 mesh screen, and preferably through a U.S. 40 mesh screen, subsequently uniformly hydrated with water at a temperature of from about 120° F., to about 160° F. to form a grain water slurry having a moisture content of from about 40% to about 65%, uniformly cooked at a temperature at least as high as the gelatinization temperature of the starch (about 165° F.–170° F.) but preferably from about 180° F. to about 220° F., and subsequently cooled so that it may be uniformly mixed with dry ingredients to form a dough having a moisture content of from about 40% to about 50%, which is susceptible to being extruded. It has been found that uniform gelatinization of the starch within the ground corn particles can be effected only if the ground corn is relatively uniform in size and uniformly hydrated prior to being subjected to the gelatinization temperature.

In order to determine the effect of using cooked whole corn, rather than the corn flour of the previous Examples, whole dry corn was ground in a conventional hammermill and screened through a standard U.S. 20 mesh screen. This ground whole corn was used in the following Examples.

EXAMPLE 15

The following recipe was used to produce a fried corn chip product:

| INGREDIENT | Wt % |
|---|---|
| Ground Whole Corn | 51.25 |
| ICM 961[1] | 18.4 |
| Amioca Starch | 16.5 |
| Corn Starch | 9.0 |
| HLF Oil[2] | 2.7 |
| Salt | 2.0 |
| GMO[3] | 0.15 |

[1]Pregelatinized corn flour manufactured by Illinois Cereal Mills.
[2]Manufactured by the Humko division of Kraft Foods.
[3]Glyceryl Mono Oleate (emulsifier)

The ground whole corn and water (at 160° F.) were blended in order to make a grain-water slurry having from about 35% to about 65% water, by weight. This corn water mixture was then mixed in a Hobart mixer for two minutes on speed 2. The mixture was then immediately transferred by use of a positive displacement pump to a Crepaco swept surface heat exchanger. The corn-water slurry remained in the steam-jacketed heat exchanger for approximately 3.8 minutes, being pumped at a rate of about 3.3 lbs./minute, and exited the heat exchanger at a temperature of about 211° F. It is believed that a substantial portion, if not all of the starch in the corn was gelatinized by this treatment. Upon being extruded from the heat exchanger, the cooked corn was directed between a pair of cooling rolls which cooled the mixture to approximately 140° F. This cooled mixture was then transferred to a second set of cooled rolls which further reduced the temperature of the mixture to approximately 70°–75° F. The cooked corn was then held for approximately two minutes and chopped in a Reitz hammermill. The remainder of the ingredients were pre-blended in a mixer for approximately 5 minutes. Thereafter, the chopped gelatinized corn was added to the other ingredients in a 12 quart Hobart mixer and mixed on speed 1 with dough hooks for 2 minutes. The resulting dough had a moisture content of 41.1%. The mixer was then increased to speed 2 for approximately 2 minutes. After being processed as set forth above, the dough was extruded through a Pastamatic pasta extruder fitted with a die having 2 round openings of 0.14 inches diameter each. As the strands emerged, they were twisted to make a braid, cut in pieces about 2.5 inches long and fried in a lab fryer at 350° F., for about 4½ minutes.

EXAMPLE 16

A corn chip product was made using the following ingredients:

| INGREDIENTS | Wt % |
|---|---|
| Ground Whole Corn | 27.45 |
| ICM 961 | 22.4 |
| Amioca Starch | 20.5 |
| Raw Corn Flour | 12.5 |
| Oat Flour | 5.0 |
| Corn Starch | 4.3 |
| Sugar | 3.0 |
| HLF Oil | 2.7 |
| Salt | 2.0 |
| GMO | 0.15 |

The above ingredients were processed as were those in Example 15, with the exception that water was added to the gelatinized corn and the dry mix to yield a final dough moisture of 41.3%. Also, the gelatinized corn mixture was extruded through a 10 inch diameter Heat and Control piston extruder, equipped to provide 550 psi pressure on the dough. The extruder was fitted with a cylindrical die with 17.2 mm. outside diameter and 1.91 mm. opening and was situated immediately over the fryer. The individual extruded pieces were fried at 350° F., for approximately 3 minutes, or until done.

The result of Examples 15 and 16 are set forth below.

|  | Example 15 | Example 16 |
|---|---|---|
| Fat content (%) | 19.0 | 15.5 |
| Moisture (%) | 1.3 | 0.8 |
| Expansion ratio | 1.53 | 1.61 |
| Flavor[1] | 3 | 3 |
| Texture[2] | 4 | 3 |

[1]On a scale of 1–5, a score of 3 is considered "good".
[2]On a scale of 1–5, a score of 3 is considered "good", a score of 4 a bit too hard.

Examples 15 and 16 demonstrate that finely ground whole corn can be mixed with water and cooked to give a gel which is gelatinized sufficiently to act as a LOWAC ingredient in this snack process. When a portion of this gelatinized corn was dried to a moisture content of about 5% and ground to pass through a standard U.S. 40 mesh screen, it resulted in an ingredient having a Modified Bostwick Index of between 25 and 40 cm. As set forth earlier, this ingredient is representative of typical LOWAC ingredients (Table 2). In the Examples a continuous process is disclosed using a swept surface heat exchanger, the preferred approach. In other tests (unreported) it was found that conventional batch processing methods can also be employed. For example, the ground corn/water slurry was placed in trays and steamed in a closed cabinet at atmospheric pressure to raise the temperature of the slurry to a temperature high enough to at least partially gelatinized the corn starch in the gel. Other batch processing units, such as closed mixers into which the steam is injected into a water slurry of ground cereals, can also be used to achieve the resultant cooked gel. However, due to the mechanical limitations in handling the cooked gel in subsequent operations such as cooling, subdividing and mixing with appropriate additional dry ingredients, it is believed that such batch processes are limited in their application. It was concluded that the moisture content of the doughs used in Examples 15 and 16, about 42%, was somewhat too low, causing the low fat content in the finished snacks, which in turn caused the resultant products to be somewhat harder than desired in some cases. Increasing the moisture content of the dough to about 43% to 44% would have been the immediate choice for one skilled in the art of snack food manufacture to increase the fat content, and thereby make the chip somewhat less hard in texture.

I claim:

1. A method for making an extruded expanded fried cereal based snack product, comprising the steps of:
   preparing a dough consisting essentially of:
   (a) a low water-absorbing component comprising fine particulate whole grain cereal solids wherein the starch contained therein is partially or substantially gelatinized, and comprises from about 35% to about 70% of the total solids contained in the dough;
   (b) a high water-absorbing component comprising one or more pregelatinized cereal starches or flours or dehydrated potatoes comprising from about 10% to about 50%, by weight, of the total solids in the dough;
   (c) a starch component comprising one or more extraneously added ungelatinized starches comprising from about 10% to about 30%, by weight, of the total solids in the dough; and
   (d) water mixed with the solids to form a dough in which the moisture content of the dough is from about 40% to about 50%, by weight, of the dough;
   extruding a dough piece from the dough; and
   frying the dough piece in hot cooking oil to form an expanded fried snack product, the dough piece containing said amounts of the components (a), (b) and (c) and having said 40% to 50% moisture content at the time of frying, the dough piece at the time of frying also containing residual raw starch provided by said amounts of components (a) and (c), component (b) having a substantially greater ability to hold water than component (a) throughout the frying step up until the gelatinization temperature of said residual raw starch is reached, thereby retaining water present in the dough piece sufficiently to combine with said residual raw starch at said gelatinization temperature to cause the residual raw starch to gelatinize and form an expanded fried snack of substantially uniform porosity throughout its cross section with an expansion from about 1.2 to about 3.0 times the original thickness of the extruded and cut dough piece.

2. The method according to claim 1 in which component (a) has an M.B.I. of more than about 20 cm., and component (b) has an M.B.I. of about less than 15 cm.

3. The method according to claim 1 including substantially avoiding gelatinization of the residual raw starch contained in the dough during the extrusion step.

4. The method according to claim 1 in which component (a) is made according to the following steps:
   (a) grinding whole grain cereal kernels into relatively fine particle size;
   (b) uniformly hydrating the ground cereal kernels with water to form a grain-water slurry; and
   (c) uniformly gelatinizing substantially all of the starch in the grain-water slurry by cooking the slurry at a temperature above the gelatinization temperature of starch.

5. The method according to claim 4 in which the grain is ground to a particle size such that it all passes through a standard U.S. 40 mesh screen.

6. The method according to claim 4 in which the ground grain is hydrated with water at a temperature of from about 120° F. to about 160° F., to form a slurry having a moisture content of from about 40% to about 65%.

7. The method according to claim 6 in which the grain-water slurry is cooked to a final temperature of at least 180° F.

8. A method for making an extruded expanded fried cereal based snack product, comprising the steps of:
   (a) grinding whole cereal grain kernels into relatively fine particle size;
   (b) uniformly hydrating the ground cereal grain with water to form a grain-water slurry;
   (c) partially gelatinizing a portion of the starch in the grain-water slurry by cooking the slurry at a temperature above the gelatinized temperature of starch;
   (d) preparing a dough consisting essentially of:
      (i) a low water-absorbing component comprising the partially gelatinized ground grain of (c) above, wherein the starch contained therein comprises from about 35% to about 70% of the total solids contained in the dough;
      (ii) a high water-absorbing component comprising one or more pre-gelatinized cereal starches or flours or dehydrated potatoes comprising from about 10% to about 50%, by weight, of the total solids in the dough;
      (iii) a starch component comprising one or more extraneously added ungelatinized starches comprising from about 10% to about 30%, by weight, of the total solids in the dough; and
      (iv) water mixed with the solids to form a dough in which the moisture content of the dough is from about 40% to about 50%, by weight, of the dough;
   (e) extruding a dough piece from the dough; and
   (f) frying the dough piece in hot cooking oil to form an expanded fried snack product, the dough piece at the time of frying containing residual raw starch provided by said amounts of components (i) and (iii), component (ii) having a substantially greater ability to hold water than component (i) throughout the frying step up until the gelatinization temperature of said residual raw starch is reached, thereby retaining water present in the dough piece sufficiently to combine with the residual raw starch at said gelatinization temperature to cause the residual raw starch to gelatinize and form an expanded fried snack of substantially uniform porosity throughout its cross-section with an expansion from about 1.2 to about 3.0 times the original thickness of the extruded and cut dough piece.

9. The method according to claim 8 in which the cereal grain is selected from the group consisting essentially of corn, wheat, barley, oats, rye and rice, or any combination thereof.

10. The method according to claim 8 in which the ground grain is hydrated with water at a temperature of from about 120° F. to about 160° F.

11. The method according to claim 10 in which the grain-water slurry is cooked to a final temperature of at least 180° F.

12. The method according to claim 8 in which the ground grain has an M.B.I. of more than about 20 cm.

* * * * *